United States Patent
Wuellner et al.

(10) Patent No.: US 9,258,770 B2
(45) Date of Patent: Feb. 9, 2016

(54) PROVIDING ACCESS POINT INFORMATION TO A USER

(71) Applicant: Google Inc., Mountain View, CA (US)

(72) Inventors: Trond Thomas Wuellner, Mountain View, CA (US); Kenneth Brian Moore, Seattle, WA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/743,302

(22) Filed: Jan. 16, 2013

(65) Prior Publication Data

US 2015/0208337 A1 Jul. 23, 2015

Related U.S. Application Data

(60) Provisional application No. 61/640,602, filed on Apr. 30, 2012.

(51) Int. Cl.
| | |
|---|---|
| *H04W 48/08* | (2009.01) |
| *H04W 48/14* | (2009.01) |
| *H04W 48/18* | (2009.01) |
| *H04W 48/20* | (2009.01) |
| *H04W 36/36* | (2009.01) |

(52) U.S. Cl.
CPC ............ *H04W 48/20* (2013.01); *H04W 36/36* (2013.01); *H04W 48/08* (2013.01); *H04W 48/14* (2013.01); *H04W 48/18* (2013.01)

(58) Field of Classification Search
USPC ......... 370/241, 252, 310, 328–329, 331–334; 709/227–229; 455/436–437, 439–440, 455/442–443
See application file for complete search history.

(56) References Cited

U.S. PATENT DOCUMENTS

| | | | |
|---|---|---|---|
| 7,532,898 B2 | 5/2009 | Halcrow et al. | |
| 2008/0186882 A1* | 8/2008 | Scherzer et al. | ............... 370/310 |
| 2012/0196644 A1* | 8/2012 | Scherzer et al. | ............... 455/524 |

* cited by examiner

*Primary Examiner* — Awet Haile
*Assistant Examiner* — Eric Myers
(74) *Attorney, Agent, or Firm* — McDermott Will & Emery LLP

(57) ABSTRACT

Aspects of the subject technology relate to systems, methods, and machine-readable media for providing an access point recommendation to a client system. A system may be configured to receive, from a plurality of reporting systems, access point reports for a plurality of access points, each access point report comprising information about an access point, prioritize the plurality of access points based on the access point reports, and provide an access point recommendation to a client system based on the prioritization of the plurality of access points.

15 Claims, 5 Drawing Sheets

300

PROVIDING ACCESS POINT INFORMATION TO A USER

RELATED APPLICATION

This application claims priority to U.S. provisional patent application 61/640,602, filed on Apr. 30, 2012, entitled "PROVIDING ACCESS POINT INFORMATION TO A USER," the entire contents of which are herein incorporated by reference in its entirety.

BACKGROUND

The present disclosure generally relates to network services and, in particular, to connecting to access points for networks.

Users that wish to connect to an access point in order to access a network (e.g., the Internet) may be presented with a user interface containing a number of access points to select from, especially when the user is in an area with many detectable access points, such as an airport. The user interface may include the access point name and a signal strength for each access point listed. However, other useful information about the access points and the network provided by the access points that may be helpful to the user making a selection is not available.

SUMMARY

Various aspects of the subject technology relate to a system for providing an access point recommendation. The system may include one or more processors and a machine-readable medium comprising instructions stored therein, which when executed by the one or more processors, cause the one or more processors to perform operations. The operations may include receiving, from a plurality of reporting systems, access point reports for a plurality of access points, each access point report comprising information about an access point in the plurality of access points, calculating performance metrics for each access point in the plurality access points based on the access point reports, prioritizing the plurality of access points based on the performance metrics for each access point, and generating at least one access point recommendation for a user based on the prioritizing.

Various aspects of the subject technology relate to a computer-implemented method for providing an access point recommendation. The method may include receiving, from a plurality of reporting systems, access point reports for a plurality of access points, each access point report comprising information about an access point, prioritizing the plurality of access points based on the access point reports, and providing an access point recommendation to a client system based on the prioritization of the plurality of access points.

Various aspects of the subject technology relate to a machine-readable medium including instructions stored therein, which when executed by a machine, cause the machine to perform operations for providing an access point recommendation. The operations may include receiving, from a plurality of reporting systems, access point reports for a plurality of access points, each access point report comprising performance data for one access point of the plurality of access points, prioritizing the plurality of access points based on the access point reports, and providing an access point recommendation to a client system based on the prioritization of the plurality of access points.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various devices may be used to connect to a network via an access point. For example, mobile devices may be configured to connect to cellular access points (e.g., cell towers) that enable access to cellular networks or wireless access points (WAP) that enable access to Wi-Fi networks. In some cases, an access point may publish a limited amount of information about the access point, such as an access point name. However, it may be difficult for users to select an access point when presented with a number of available access points to connect to based on such limited information.

Accordingly, various aspects of the subject technology relate to systems and methods for gathering data about a access points from a number of users and reporting devices, compiling the collected information for each access point, and generating access point recommendations that include information about the access points that may be useful to a user. These recommendations may then be provided to a client system where it may be displayed to a user and enable the user to make a more informed selection of which access point to connect to.

Figure 1:
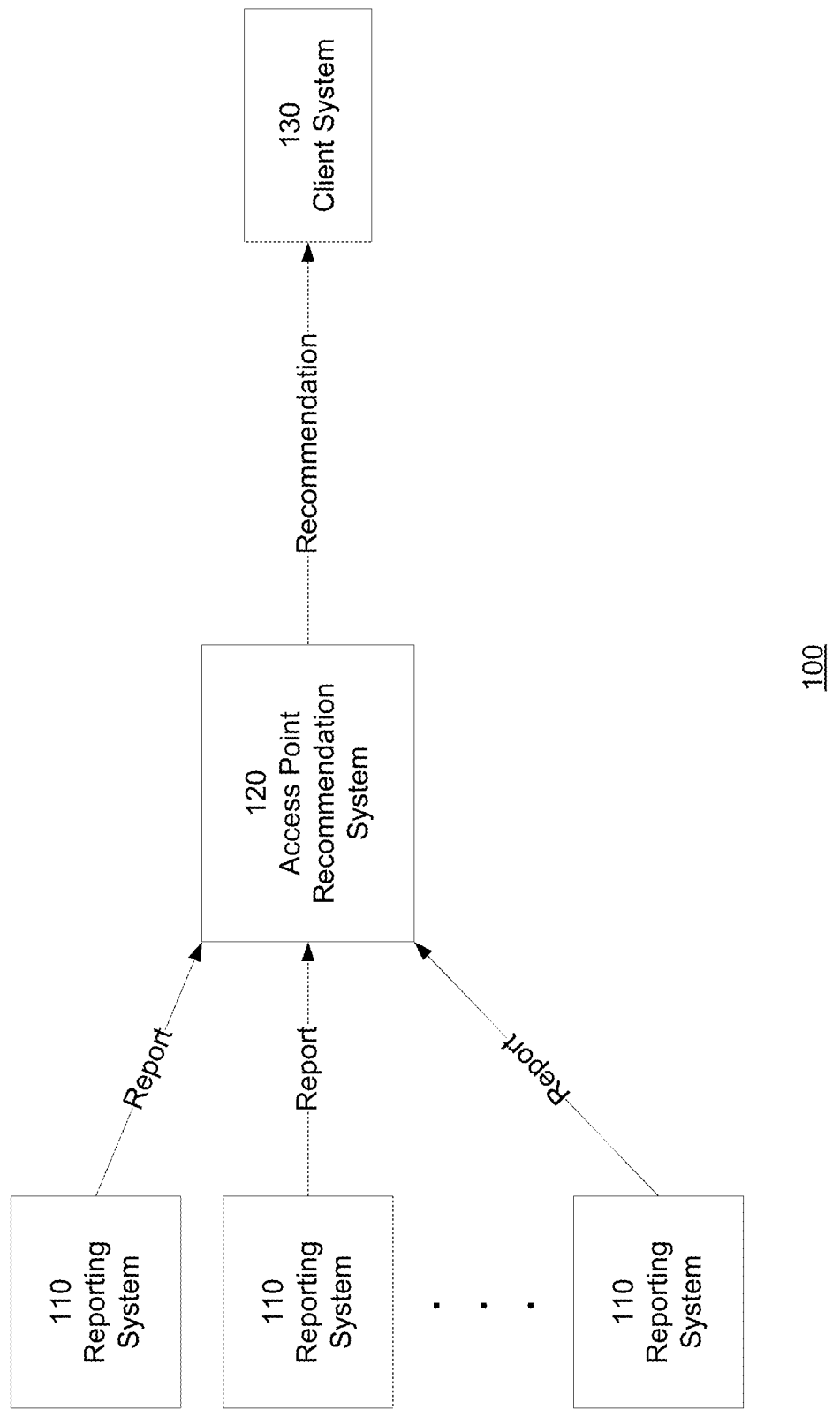
FIG. 1 is a block diagram illustrating an example network environment in a system for providing access point recommendations to a client device may operate, in accordance with one aspect of the subject technology.

FIG. 1 is a block diagram illustrating an example network environment 100 in a system for providing access point recommendations to a client device may operate, in accordance with one aspect of the subject technology. Although FIG. 1 illustrates a client-server network environment 100, other aspects of the subject technology may include other configurations.

The network environment 100 includes one or more reporting systems 110, an access point recommendation system 120, and one or more client system 130. As will be discussed further below, the reporting systems 110, the access point recommendation system 120, and the client systems 130 may be connected to one another over one or more networks or sub-networks (e.g., a cellular network or a Wi-Fi network). In some cases, the network communications may occur using different technologies or a combination of technologies.

The reporting systems 110 may be embodied as, for example, mobile devices (e.g., a smart phone or a global positioning system (GPS) device), laptop computers, tablet computers, hotspot devices, or any other devices able to connect to an access point. The client systems 130 may also be embodied as any of these systems and devices. According to one aspect, a reporting system 110 in one scenario may be a client system 130 in another scenario.

The reporting systems 110 may be configured to connect to a network (e.g., the internet) through an access point and collect information about the access point and the connection to a network. The information collected by a reporting system 110 may include performance data such as, security settings for the access point, the upstream and downstream bandwidth for the access point, the number of other users connected to the access point, whether the user is redirected to a portal site (e.g., a webpage that request payment for connecting the access point), or whether network traffic is rerouted to a proxy.

The reporting system 110 may also determine a location for the access point and identification data for the access point. The identification data may include a service set identifier (SSID) that identifies a particular 802.11 wireless local area network (LAN) and/or a media access control (MAC) address assigned to the access point. Using the identification data, the reporting system may determine an access point identifier that may be used to uniquely identify the access point. The access point identifier may be, for example, a MAC address itself or a hash value generated based on the MAC address and the service set identifier (SSID).

The location of the access point may be an address or location coordinates which may be obtained if the access point that the reporting system is connected to publishes (or otherwise makes visible to reporting systems looking to connect to it) the access point's location information. In another aspect, a reporting system 110 configured to determine location coordinates (e.g., a mobile device with a global positioning system) may be able to calculate location coordinates when connected to the access point and use the location coordinates as the location of the access point.

According to one aspect, the reporting system may also prompt a user to enter a rating or comments about an access point and the performance of the network while being connected to the access point. For example, a user may be presented with a user interface that allows the user to rate the access point's service using a rating system of a number of stars or allows the user to endorse an access point. The user interface may also allow a user to input other information such as whether or not the user needed to pay in order to connect to the access point and how much the user paid.

After the information about the access point and the connection to a network is collected, the reporting system 110 may generate an access point report that contains the information along with an access point identifier and the location for the access point and transmit the access point report to a access point recommendation system 120. The access point recommendation system 120 may be configured to receive access point reports from a number of reporting systems and store the information in the access point report in a database using the access point identifier as a key.

The access point recommendation system 120 may be configured to calculate various performance metrics for a number of access points based on the information contained in the access point reports received from the reporting systems and prioritize the access points based on the performance metrics. The access point recommendation system 120 may further generate one or more access point recommendations for a user on a client system 130 based on the prioritized access points.

Figure 2:
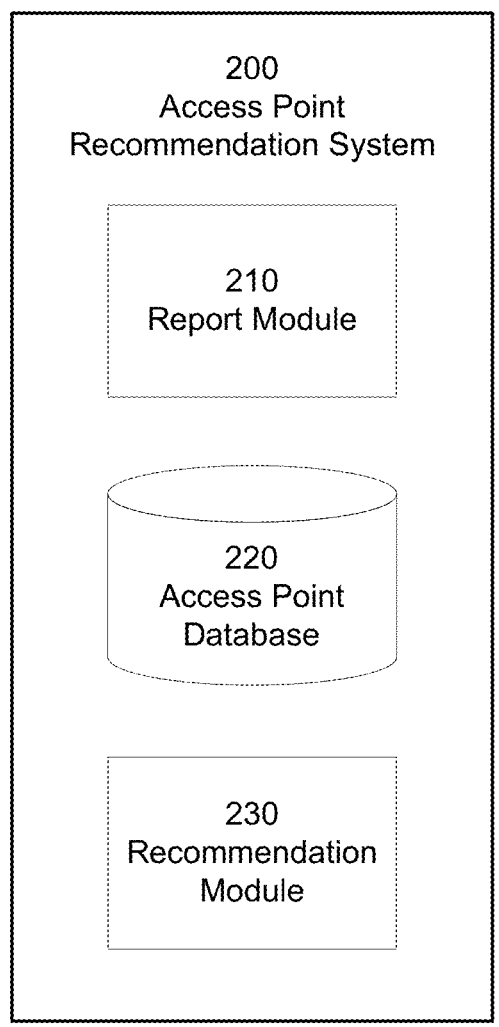
FIG. 2 is a block diagram illustrating an example access point recommendation system, in accordance with one aspect of the subject technology.

FIG. 2 is a block diagram illustrating an example access point recommendation system 200, in accordance with one aspect of the subject technology. While the access point recommendation system 200 is shown in one configuration in FIG. 2, in other configurations, the access point recommendation system 200 may include additional, alternative, and/or fewer components.

The access point recommendation system 200 may include a report module 210, an access point database 220, and a recommendation module 230. The report module 210 may be configured to receive access point reports from a number of reporting systems. The access point reports, which may include an access point identifier and information about an access point, may be stored in the access point database 220 using the access point identifier as a key.

The report module 210 may also be configured to calculate a number of performance metrics based on the information in the access point reports. For example, the access point reports may include information such as security settings a reporting system used to connect to an access point, maximum upload and download speeds while the reporting system was connected to the access point, average upload and download speeds while the reporting system was connected to the access point, the average number of users connected to the access point while the reporting system was connected to the access point, whether the reporting system was redirected to a portal site when connecting to the access point, the address of the portal site, whether network traffic is rerouted to a proxy while the reporting system was connected to the access point, whether the user was required to pay to connect to the access point, how much the user had to pay, etc.

Based on the information in the access point reports, the report module may determine characteristics, including performance metrics, for a particular access point. Some example characteristics may include an average upload or download speed, security settings or protocols, an average number of users connected to the access point, whether the access point requires payment, and how much payment is required.

According to one aspect, each of the access point reports may be associated with a timestamp that corresponds to a time that the access point was created or received. In order to keep characteristics of a particular access point more current, information in more recently received access point reports may be weighted more heavily that information in older access point reports. Furthermore, access point reports with timestamps that are older than a threshold date (e.g., 2 weeks) are not considered in some cases and may be removed from the access point database 220.

The recommendation module 230 may be configured to generate one or more access point recommendations for a user and transmit the one or more access point recommendations to the user's client system. According to one aspect, the recommendation module 230 may prioritize the set of access points by determining a priority score for each of the access points. The scores may be based on a calculation that assigns various weights to various factors or signals.

One example calculation may be in the format provided below:

$$\text{Priority Score} = (w1 \cdot f1) + (w2 \cdot f2) + (w3 \cdot f3) \qquad \text{Equation (1)}$$

where f1, f2, and f3 are factors (e.g., average download speed, average upload speed, security settings, amount of payment needed, or other characteristics of the access point) and w1, w2, and w3 are weights assigned to the factors. Other calculations, however, may also be used. Furthermore, instead of determining priority scores for only the access points in the identified set of access points, the recommendation module 230 may also determine a priority score for all access points before a request is received.

According to one aspect of the subject technology, the recommendation module 230 may generate access point recommendations for a user based on the location of the user. In one example, the user's client system may submit a access point recommendation request that includes the location (e.g., location coordinates) of the user. The request may be sent, with or without the user's knowledge, using any number of means (e.g., over a cellular network, using a Short Message Service (SMS) protocol, etc.). In response to receiving the request, the recommendation module 230 may identify a set of access points located near the location of the user, prioritize the set of access points based on information contained in the access point database 220, and generate one or more access point recommendations based on the prioritized set of access points.

According to another aspect of the subject technology, the recommendation module 230 may generate access point recommendations for a user based on the locations that the user frequents. For example, a client system may be configured to intermittently report the location coordinates of a user to the access point recommendation system 200. The recommendation module may use the location coordinates received from the client system to identify locations that a user frequents (e.g., locations that a user has visited at least 3 separate times). Accordingly, the recommendation module 230 may identify access points located near the locations that the user frequents, prioritize the access points based on information contained in the access point database 220, and generate one or more access point recommendations for the user.

After the access point recommendations are generated, they may be transmitted to the user's client system where they may be displayed to the user in a user interface or stored until the user wishes to connect to an access point. According to one aspect, the access point recommendations may be transmitted to the client system over a different network than the network associated with the access point. For example, if the access point provides users with access to a Wi-Fi network, the access point recommendations may be transmitted to the client system via a cellular network (e.g., a 3G network). According to other aspects, other networks and technologies may also be used.

Figure 3:
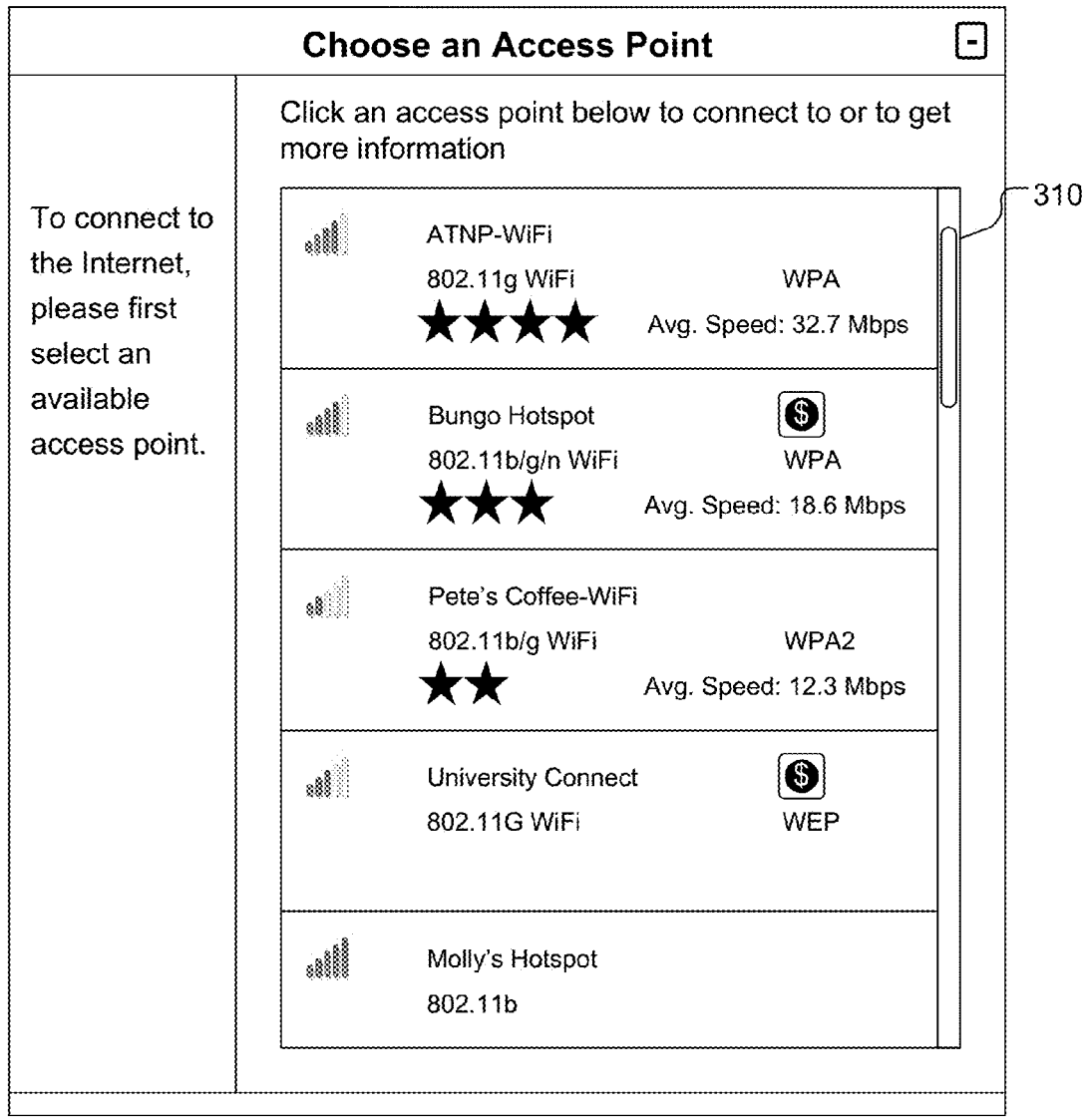
FIG. 3 is an example user interface illustrating access point recommendations, in accordance with one aspect of the subject technology.

FIG. 3 is an example user interface 300 illustrating access point recommendations, in accordance with one aspect of the subject technology. The user interface 300 may be displayed to a user on a client system when the user wishes to connect to a network (e.g., the internet) via an access point. Although the user interface 300 shows access points for Wi-Fi networks, other types of access points are also considered in other aspects. The user interface 300 may include an interface element 310 that contains the access point recommendations generated by the recommendation module 230.

The generated access point recommendations may include information about access points that may be useful to a user in selecting an access point. For example, the access point recommendations may include, among other things, the name of the access point, a location for the access point, a signal strength associated with the access point, the connection type (e.g., 802.11b/g/n), an average bandwidth as measured by other users, and the security protocols used by the access points (e.g., Wi-Fi Protected Access (WPA) or Wired Equivalent Privacy (WEP)). The access point recommendations may also include an indication of whether or not the access point requires payment and a recommendation indicator that represents a recommendation level assigned by the recommendation module 230 (e.g., a number of stars) and based on the priority score calculated by the recommendation module 230.

In other aspects, the access point recommendations may include any other information that may be extracted from the access point reports received from the reporting systems. For example, the access point recommendations may include an average upload and/or download bandwidth, peak bandwidths for uploads and/or downloads, and an average number of users connected to the access point. Based on the information in the access point recommendations provided by the access point recommendation system 200, the user may be able to make a more informed selection of an access point to connect to.

Figure 4:
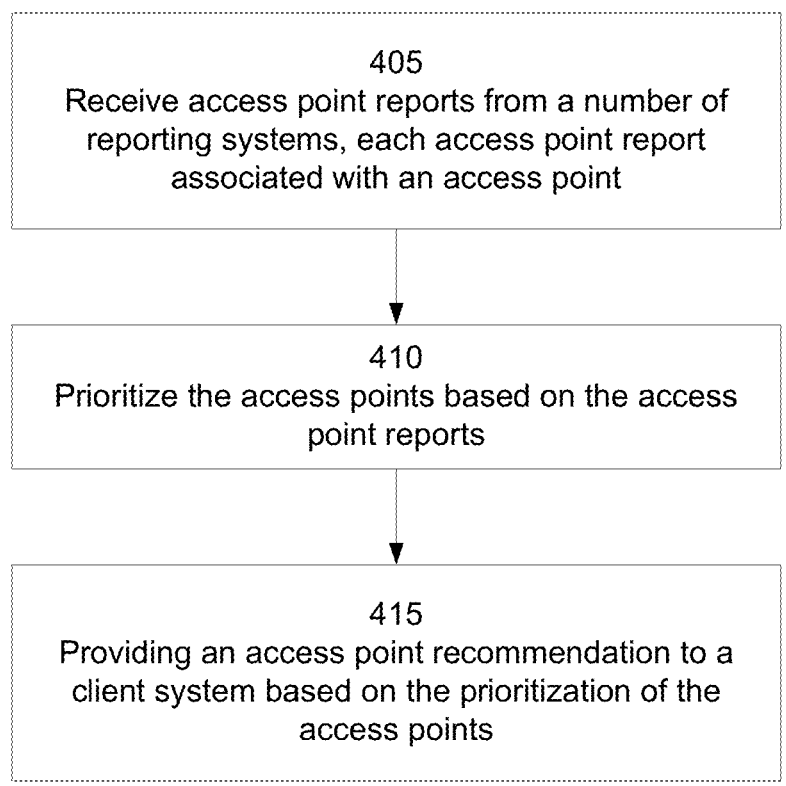
FIG. 4 is a flow chart illustrating an example process for providing access point recommendations, in accordance with various aspects of the subject technology.

FIG. 4 is a flow chart illustrating an example process 400 for providing access point recommendations, in accordance with various aspects of the subject technology. Although the steps in FIG. 4 are discussed with respect to the components of the system 200 illustrated in FIG. 2, the steps are not limited to these modules. Furthermore, although the steps are shown in one particular order, additional steps, fewer steps, or other orderings of the steps are also possible.

At step 405, the report module 210 may receive access point reports from a number of different reporting systems. Each access point report may be generated by a reporting system when the reporting system interacts (e.g., connects) with a particular access point and the access point report may include information regarding the reporting system's experience with the particular access point. As mentioned above, the access point report may include characteristics of the access point or any other information associated with the access point.

Based on the received access point reports, at step 410, the recommendation module 230 may prioritize the access points associated with the access point reports. An access point may be prioritized by determining the characteristics of the access point using access point reports associated with the access point and determining a priority score for the access point using a calculation that assigns various weights to the various characteristics of the access point.

The recommendation module 230 may then provide one or more access point recommendations to a client system based on the prioritization of the access points. In some cases, the access point recommendations may be provided to a user's client system in response to a user, wanting to connect to an available access point, transmits a request for access point recommendations to the access point recommendation system 200.

In other cases, however, the access point recommendations, including information about the access points, may be transmitted to the user's client system at any time and may be stored on the client system. When the user opens an access point selection interface on the client system, the access point recommendations for nearby access points may be retrieved and displayed to a user.

According to one aspect, the location coordinates may be Global Positioning System (GPS) coordinates. However, one or more other technologies may be used in addition to or instead of GPS to determine location coordinates representing the user's location. For example, location information may be obtained by identifying one or more cell towers that a mobile device may detect or detecting one or more wireless networks with known locations within range of the mobile device. Thus, it should be understood that location coordinates can be used to report location information for a user as discussed herein regardless of the technology or technologies used to determine the location coordinates.

According to one aspect, regardless of how location data is obtained, appropriate efforts may also be taken to protect privacy rights of the entities. For example, collection of location data may be on an opt-in basis so that data is not collected unless the entity has granted permission, with the location data stored and handled in a secure manner. Additionally, steps can be taken to anonymize the location data to ensure that the location data cannot be tied to a particular entity and/or to a particular device.

Figure 5:
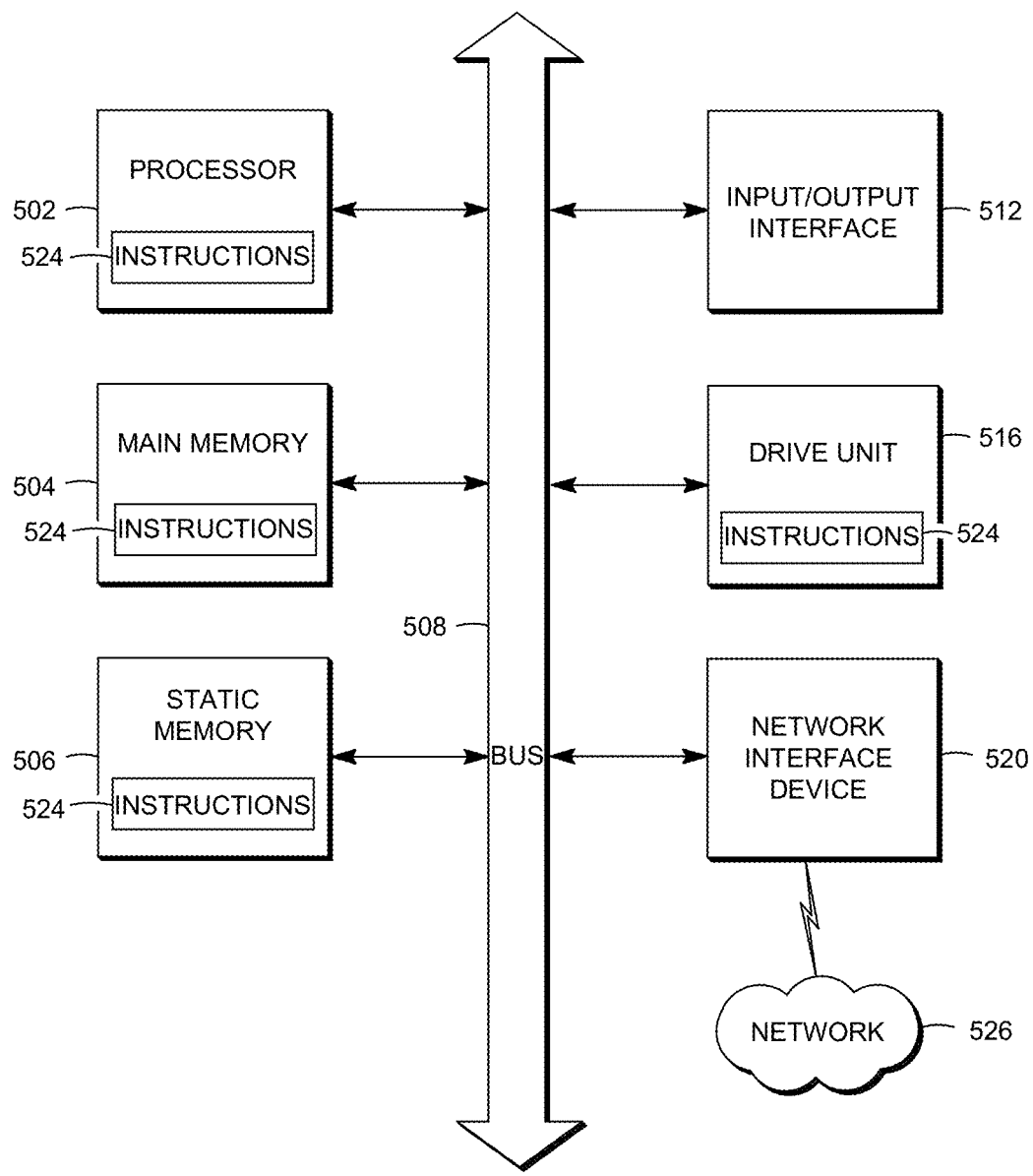
FIG. 5 is a block diagram illustrating an example computer system with which any of the devices or systems described herein may be implemented.

FIG. 5 is a block diagram illustrating an example computer system 500 with which any of the devices or systems described herein may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may comprise the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method for providing an access point recommendation, the method comprising:
   receiving, from a plurality of reporting systems, access point reports for a plurality of access points associated with a plurality of networks, each access point report comprising information about an access point from the plurality of access points, wherein the information about each access point comprises payment requirement information and at least one of a location information, an average bandwidth, a peak bandwidth, a number of users connected, security settings information, or user rating information;
   calculating performance metrics for each access point of the plurality of access points based on a sum of a first weighted value of the payment requirement information and one or more second weighted values of the at least one of the location information, the average bandwidth, the peak bandwidth, the number of users connected, the security settings information, or the user rating;
   prioritizing the plurality of access points based on the access point reports and the performance metrics; and
   providing an access point recommendation to a client system based on the prioritization of the plurality of access points, wherein the providing comprises transmitting the access point recommendation to the client system over a network different than each of the plurality of networks, and wherein the access point recommendation comprises the payment requirement information for the plurality of access points.

2. The computer-implemented method of claim 1, wherein the information about each access point further comprises at least one of a gateway site associated with the access point, or a proxy through which traffic associated with the access point is routed.

3. The computer-implemented method of claim 1, wherein the information about each access point further comprises an identifier for the access point based on a media access control (MAC) address for the access point and a service set identifier (SSID) for the access point.

4. The computer-implemented method of claim 1, wherein at least one access point from the plurality of access points is a wireless access point that enables the client system to wirelessly connect to a network from the plurality of networks associated with the at least one access point.

5. The computer-implemented method of claim 1, wherein the providing of the access point recommendation to the client system comprises:
   determining a location of the client system;
   identifying one or more access points near the location of the client system; and
   generating the access point recommendation based on the prioritizing of the one or more access points near the location of the client system.

6. The computer-implemented method of claim 1, wherein the access point recommendation is configured to be displayed on the client system along with a recommendation indicator.

7. The computer-implemented method of claim 1, wherein the access point recommendation further comprises at least one of an average bandwidth, a peak bandwidth, an average number of users connected to each access point, security settings for each access point, or an average user rating.

8. The computer-implemented method of claim 1, wherein the plurality of reporting systems are client systems other than the client system.

9. The computer-implemented method of claim 1, wherein the access point recommendation is provided to the client system in response to receiving a request for recommendation from the client system.

10. The computer-implemented method of claim 1, wherein the plurality of networks are networks and the network different than each of the plurality of networks is a cellular network.

11. A system for providing an access point recommendation, the system comprising:
   one or more processors; and
   a machine-readable medium comprising instructions stored therein, which when executed by the one or more processors, cause the one or more processors to perform operations comprising:
   receiving, from a plurality of reporting systems, access point reports for a plurality of access points associated with a plurality of networks, each access point report comprising information about an access point from the plurality of access points, wherein the information about each access point comprises payment requirement information and at least one of a location information, an average bandwidth, a peak bandwidth, a number of users connected, security settings information, or a user rating;
   calculating performance metrics for each access point of the plurality access points based on a sum of a first weighted value of the payment requirement information and one or more second weighted values of the at least one of the location information, the average bandwidth, the peak bandwidth, the number of users connected, the security settings information, or the user rating;
   prioritizing the plurality of access points based on the access point reports and the performance metrics for each access point;
   generating at least one access point recommendation for a user based on the prioritizing; and
   transmitting the access point recommendation to a client system of the user over a network different than each of the plurality of networks, and wherein the access point recommendation comprises the payment requirement information for the plurality of access points.

12. The system of claim 11, wherein each access point from the plurality of access points is a wireless access point that enables the client system to wirelessly connect to the plurality of networks associated with the plurality of access points.

13. The system of claim 11, wherein the generating of the at least one access point recommendation comprises:
   determining locations that the user frequents;
   identifying one or more access points near the locations that the user frequents; and
   generating the at least one access point recommendation based on the performance metrics of the one or more access points near the locations that the user frequents.

14. The system of claim 11, wherein the access point recommendation further comprises at least one of the average bandwidth, the peak bandwidth, the average number of users connected, the security settings, or the average user rating.

15. A non-transitory machine-readable medium comprising instructions stored therein, which when executed by a machine, cause the machine to perform operations comprising:
   receiving, from a plurality of reporting systems, access point reports for a plurality of access points associated with a plurality of networks, each access point report comprising performance data for one access point from the plurality of access points, wherein the information about each access point comprises payment requirement information and at least one of a location information, an average bandwidth, a peak bandwidth, a number of users connected, security settings information, or a user rating;

calculating performance metrics for each access point of the plurality of access points based on a sum of a first weighted value of the payment requirement information and one or more second weighted values of the at least one of the location information, the average bandwidth, the peak bandwidth, the number of users connected, the security settings information, or the user rating;

prioritizing the plurality of access points based on the performance data of the access point reports and the performance metrics; and providing an access point recommendation to a client system based on the prioritization of the plurality of access points, wherein the providing comprises transmitting the access point recommendation to the client system over a network different than each of the plurality of networks, and wherein the access point recommendation comprises the payment requirement information for the plurality of access points.

* * * * *